W. A. SLOSS.
PRODUCTION OF AMMONIUM SULFATE.
APPLICATION FILED MAY 22, 1919.
1,328,342.
Patented Jan. 20, 1920.
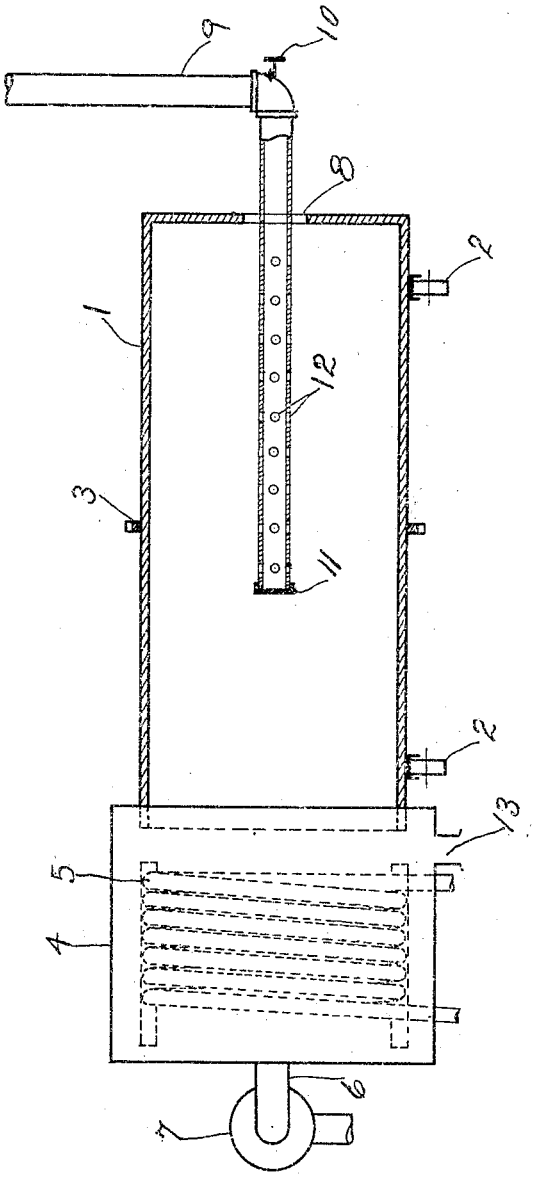
INVENTOR
William A. Sloss
BY
Chas. W. Mortimer
ATTORNEY

UNITED STATES PATENT OFFICE.

WILLIAM A. SLOSS, OF TOLEDO, OHIO.

PRODUCTION OF AMMONIUM SULFATE.

1,328,342.  Specification of Letters Patent.  Patented Jan. 20, 1920.

Application filed May 22, 1919. Serial No. 299,247.

*To all whom it may concern:*

Be it known that I, WILLIAM A. SLOSS, a citizen of the United States of America, residing at Toledo, in the county of Lucas and State of Ohio, have invented certain new and useful Improvements in the Production of Ammonium Sulfate, of which the following is a specification.

This invention relates to the production of ammonium sulfate which shall not be acid and shall be free from pyridin bases. The object of the invention is to produce such sulfate in an economical and efficient manner without waste of the original crystals.

In the production of ammonium sulfate as a by-product from illuminating gas manufacture and coke-works, it has been customary to pass the gases containing ammonia through a saturator bath of sulfuric acid solution whereupon ammonium sulfate is formed and is precipitated when the concentration reaches the proper amount. These crystals are collected and the surplus liquor is drained off or removed in a centrifuge. Some of the acid mother liquor clings to the surfaces of the crystals and, being hygroscopic, causes the crystals to absorb moisture especially when the air is damp.

Pyridin bases also enter the saturator bath and either unite with the sulfuric acid and are precipitated or become mixed with the ammonium sulfate crystals, thereby imparting an objectionable odor to the same. By this invention the ammonium sulfate is thoroughly dried and neutralized and the pyridin bases are removed therefrom while the amount of ammonium sulfate is actually increased over that usually obtained in the ordinary course of manufacture.

This invention is applicable to ammonium sulfate produced from any source where it contains acid, pyridin bases, sulfates of pyridin bases, or either or all of these or similar deleterious substances. In carrying out this invention the ammonium sulfate to be treated is heated in any convenient way to the proper temperature and is treated with ammonia, ammonia vapors, or ammonium hydroxid to neutralize the excess acid and to decompose the sulfates of the pyridin bases, thereby forming ammonium sulfate while the pyridin bases, being volatile at the temperature which is maintained, will be removed.

The invention will be understood from the description in connection with the accompanying drawing which is a section through one type of apparatus by means of which the process can be performed.

In this drawing reference character 1 represents a cylindrical container mounted upon rollers 2, so that it slopes downwardly, and can be turned about its horizontal axis by gear 3. At one end of the container 1 is mounted a chamber 4 provided with a heating coil 5. A pipe 6 from pump 7 leads air into the chamber 4 where it is heated by the coil 5, after which it enters the container.

Leading through an opening, 8, in the other end of the container 1, is a supply pipe, 9, for ammonia, ammonia vapors or ammonium hydroxid. This supply pipe 9 is provided with a regulatable valve, 10, and is closed at its inner end by means of a cap, 11. The pipe, 9, preferably extends about half way into the container, 1, and is provided with a series of perforations 12, through which the ammonia is introduced into the container 1.

The operation is as follows:—The damp ammonium sulfate which is to be dried and purified, is introduced into the container 1 through opening 8, and the container 1 is started to revolve, whereupon the crystals slowly travel toward the other end as they are turned in the container. At the same time air which has been heated in the receptacle 4, to about 250° F., is introduced into the end of the container and serves to dry the moisture out of the mass. Also ammonia, ammonia vapors, or ammonia hydroxid is introduced through pipe 9, and passing out of the perforations 12, comes into contact with the impure ammonia sulfate to neutralize the excess sulfuric acid and form ammonium sulfate which is not volatile and is therefore added to the original material. This ammonia also decomposes the sulfates of the pyridin bases, setting these bases free and forming more ammonium sulfate, which is also carried to the lower end of the container 1 and the dried and purified ammonium sulfate in increased quantity is finally withdrawn through opening 13 in receptacle 4. The freed pyridin bases are volatilized by the hot air which also removes the moisture from the sulfate and are carried by the air out through the opening 8. By adjusting the valve 10 the amount of ammonia supplied may be regulated so that there is very little, if any, waste of the same.

What I claim and desire to secure by Letters Patent is:—

1. The process of purifying ammonium sulfate which comprises heating commercial ammonium sulfate, and treating the same with ammonia while it is still hot.

2. The process of purifying ammonium sulfate which comprises heating commercial ammonium sulfate to a temperature above that at which pyridin becomes volatile, and treating the same with ammonia while said temperature is maintained.

3. The process of purifying ammonium sulfate which comprises heating ammonium sulfate, which contains pyridin, to a temperature above that at which pyridin becomes volatile, and treating the same with ammonia while said temperature is maintained.

4. The process of purifying ammonium sulfate which comprises heating ammonium sulfate, which contains pyridin, to a temperature above that at which pyridin becomes volatile, and treating the same with ammonia at such a temperature that the pyridin will be removed.

5. The process of purifying ammonium sulfate which comprises heating ammonium sulfate, which contains pyridin and free acid, and treating the same with ammonia while it is hot.

6. The process of purifying ammonium sulfate which comprises heating ammonium sulfate, which contains pyridin and free acid, and treating the same with sufficient ammonia to neutralize the free acid, at such a temperature that the pyridin will be removed.

7. The process of purifying ammonium sulfate which comprises heating a mixture containing ammonium sulfate, free sulfuric acid, and sulfates of pyridin bases with sufficient ammonia to neutralize the sulfuric acid and decompose the pyridin sulfate, at such a temperature that the pyridin will be volatilized.

8. The process of purifying ammonium sulfate which comprises simultaneously passing hot air and ammonia vapor along the surface of commercial ammonium sulfate.

In testimony whereof I affix my signature.

WILLIAM A. SLOSS.